Jan. 25, 1966 W. K. FRENCH 3,231,861

AUTOMATIC RECOGNITION OF FINGERPRINTS BY SENSING THE SKIN SURFACE WITH ELECTRICAL APPARATUS

Filed Sept. 1, 1960

3 Sheets-Sheet 1

INVENTOR

WALTER K. FRENCH

BY Sughrue, Rothwell, Mion & Zinn

ATTORNEYS

United States Patent Office 3,231,861

Patented Jan. 25, 1966

3,231,861

AUTOMATIC RECOGNITION OF FINGERPRINTS BY SENSING THE SKIN SURFACE WITH ELECTRICAL APPARATUS

Walter K. French, Montrose, N.Y., assignor to International Business Machines Corporation, New York, N.Y., a corporation of New York Filed Sept. 1, 1960, Ser. No. 53,425
12 Claims. (Cl. 340—149)

This invention relates to a system for transducing an individual's fingerprint or skin ridge and depression pattern into electrical signals and comparing these with signals representing a fingerprint for automatic recognition purposes.

There is particular emphasis on positive individual recognition in a large number of present day endeavors. Although a number of systems have been developed for individual identification by the means of identification cards with signatures and the like, all of these systems have the inherent defect that identification cards may be switched or duplicated and signatures can be forged. It has long been recognized that the one practically indestructible means for positive identification of every single individual on the earth is by means of skin representations such as fingerprints, footprints, handprints and the like.

The human skin on the soles of the feet and the inner surface of the hands and fingers contains numerous ridges or elevations and furrows or depressions arranged in various patterns or forms. These have various physiological uses and purposes but sociologically, one of the most important uses of the pattern of these ridges and depressions in the skin configuration is for positive identification purposes.

The ridge patterns of the skin area on the soles of the feet and the inner surface of the hands and fingers may be reproduced in a known manner by ink prints. These prints of the fingers are somemtimes termed "fingerprints" but this term will be used hereinafter in the specification and claims in its generic sense to denote the ridge pattern of such skin area parts, as well as a printed pattern thereof. It is well known that fingerprints enable positive identification of individuals and because of such positive identification which, generally speaking, cannot be destroyed and is always on the individual, furnish an excellent means of identification. The ridge and depression patterns on such skin areas are present at birth and last even after death until destruction or decomposition. The fingerprint system of identification is without a doubt the best and most approved method for positive identification of individuals.

Although fingerprint detection is highly developed and is widely used in police work with the Federau Bureau of Investigation keeping a large file of individual identifying fingerprints, it has not obtained widespread usage in commercial fields because of the difficulty in the essentially manual and visual identification and comparison requiring specially trained experts for fingerprint comparison, filing and recognition. It would be highly desirable to be able to automatically accomplish individual identification in commercial endeavors such as credit protection and identification, insurance identification and protection as well as security and criminal detection operations. As far as is known, there is no commercially successful automatic means for recognition of fingerprints. Accordingly, it is a primary object of this invention to provide a fingerprint transducer and accompanying system for establishing an individual's identity by automatic recognition of his fingerprints.

In order to be able to automatically recognize fingerprints when examined directly from a human finger, it is necessary to transduce the ridges and depressions of a particular skin configuration into electrical information which can be handled in a data processing system. From previous studies it has been determined that a single line across a fingerprint contains sufficient information to distinguish between different fingerprints. Accordingly, it is an additional object of this invention to provide a fingerprint transducer which will detect the form of the ridges and depressions as well as the width, position and spacing thereof and transduce this information into electrical pulse form.

In order to assure fingerprint comparison by tracing a single line or path across the fingerprint or skin configuration of an individual, there must be means for insuring that this same line will be retraced on the finger each time it is presented for identification and recognition and that this will compare a signal from storage representing a line across a fingerprint of the allegedly same individual being identified. Therefore, it is an additional object of this invention to provide an optical finger locating means for positioning a finger relative to a fingerprint transducer so that movement of the transducer will transduce the ridges and valleys in a single line across the fingerprint into electrical information, this single line being the same line as that representing stored fingerprint information.

After transducing a particular individual's fingerprint from a human finger into electrical representations, it is desirable to compare these representations with stored representations of the fingerprint of the individual being identified. It is another object of this invention to provide a system for using signals produced by a fingerprint transducer in comparing these developed signals with a properly addressed and synchronized train of signals developed from a storage medium which stores fingerprint representations of a large number of individuals.

With the storage for a plurality of signals representing individual fingerprints of many people and selective comparison with signals produced from a human finger by a fingerprint transducer, it is also necessary to provide a means for synchronizing the extraction of a particular stored fingerprint signal with the signals developed by a fingerprint transducer. The foregoing is a further object of this invention.

Other objects and advantages of the invention will be pointed out in the following description and claims and illustrated in the accompanying drawings, which disclose, by way of example, the principles of the invention and the best mode which has been contemplated of applying these principles.

In general, the invention provides a mechanical fingerprint transducer having a small extending stylus adapted to engage the ridges and depressions of the skin pattern on the underside and tip of a human finger and make a linear scan therealong. The particular width and spacing of the ridges in the skin pattern is represented by movement of the stylus and this is translated to electrical information by an extremely sensitive electric switch. In order to assure that the scan along the finger by the transducer is taken at the same position as the representations of previously stored fingerprints taken from a single path along the fingerprint, an optical finger positioning means is utilized including a beam splitter so that the position of a human finger to be scanned can be compared to the position of the fingerprint as stored on an identification card so that when the image of the actual finger skin pattern and the image of the fingerprint on the identification card are aligned the transducer may be operated to move in a straight path or linear scan relative to the finger. The movement of the transducer during its scan produces electrical signals which may be recorded or compared with similar type signals from storage characteristic of a fingerprint ridge pattern. A recognition logic system compares the transducer produced signal with the stored signal from a temporary memory to determine if the two signals are similar. The signal from a temporary memory may be obtained from a larger population memory unit which contains identifying signals for an extremely large number of individuals such as an entire population. The population storage may be referenced to extract the information to the temporary storage by any convenient means such as a keying unit, a card reader or the signal produced by the fingerprint transducer. The output of the comparison or recognition unit may indicate that the fingerprint read by the transducer is the same as the one whose characteristics are recorded in the memory and being compared, or it can indicate that the signals are different. There may also be an intermediate case where the machine cannot decide because of various reasons such as the characteristics of the finger including scars, dirt and the like or slight misalignment of the finger, etc. In this case a rerun is desirable.

Figures 1, 2, 3, 4:
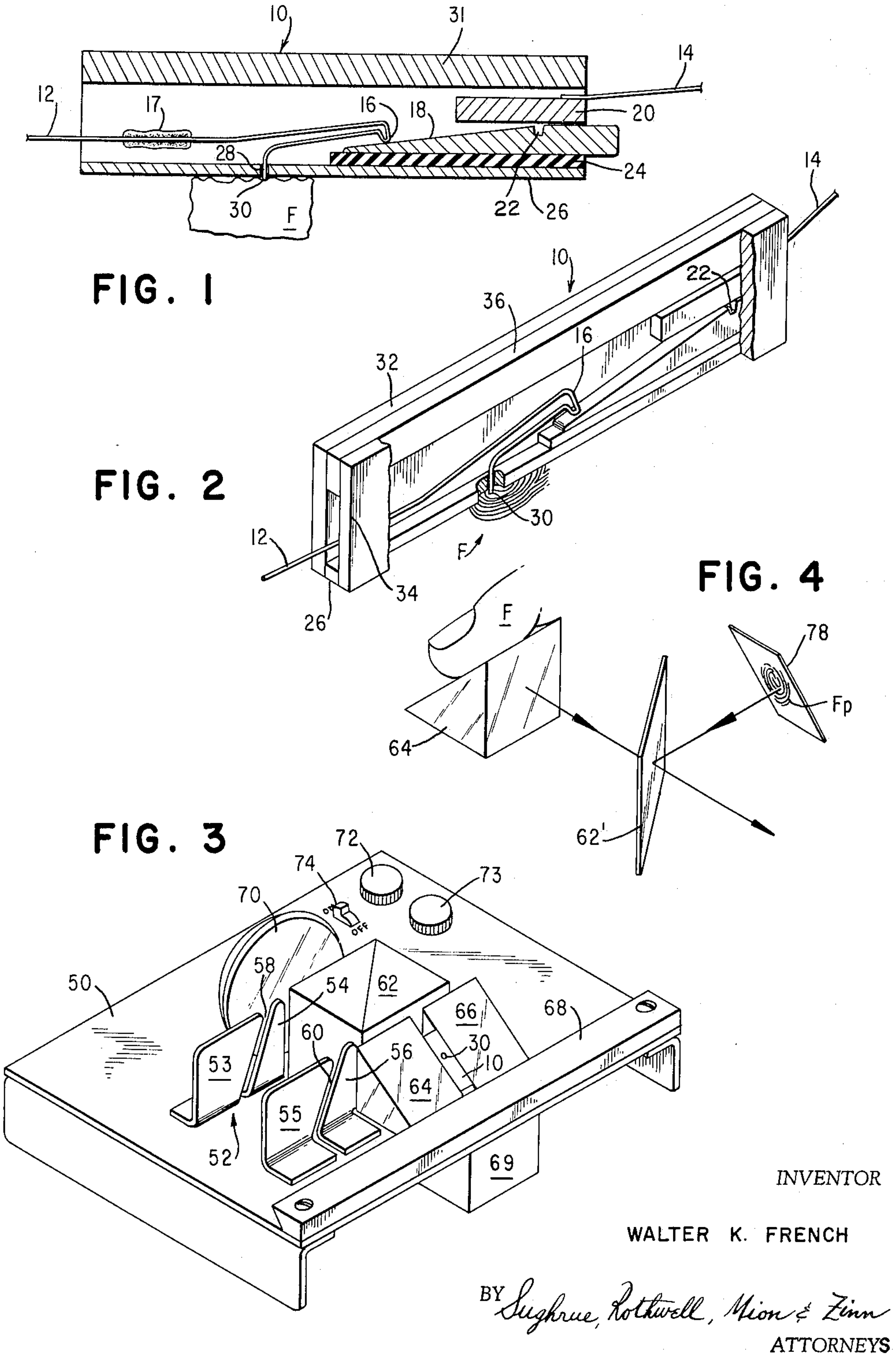
FIG. 1 is a side sectional elevation of a fingerprint transducer of this invention.
FIG. 2 is a perspective view of the mechanical fingerprint transducer mechanism with a portion broken away for the sake of clarity.
FIG. 3 is a perspective view of an optical finger positioning or locating means to enable the positioning of a human finger relative to the transducer and aligning the finger for a scan by the transducer.
FIG. 4 is a diagrammatic representation of the optical system of the finger positioning means of FIG. 3.

Referring now to the drawings, FIGS. 1 and 2 show a mechanical fingerprint transducer for converting ridges between the valleys of the distinctive fingerprint on a particular linear scan thereacross by mechanical motion into electrical signals indicating the width of these ridges and the spaces therebetween. A particular type of mechanical fingerprint transducer 10 is shown in FIGS. 1 and 2. An electrical circuit is made between fine wires 12 and 14 by a contact 16 formed into and integral with wire 12 normally bearing against a conductive wedge 18. Since the contact pressure is very light, the contact area should be of suitable material to insure good contact surfaces; for example, silver paint could be used on these surfaces. Conductive wedge 18 may be linearly positioned by means of a conductive guide 20 having a tongue 22 depending therefrom for linearly positioning the wedge 18 with respect to the contact point 16 of wire 12. Wire 14 is attached to conductive guide 20. Below edge 18 there is a layer of insulation 24 between the wedge and a smooth bottom portion 26 of the transducer. The bottom portion 26 includes a hole or aperture 28 for protrusion of a mechanical stylus 30 which is the rounded end of conductor 12 protruding slightly beyond the bottom 26 to engage the ridge and depression pattern of a finger F positioned adjacent thereto, as shown exaggerated in FIG. 1 for the sake of clarity. The amount of protrusion is controlled by the position of wedge 18. The whole switch contact assembly is enclosed in a thin plastic case including outer sides 32 and 34 and top plastic cover 36 which leaves a space in the ends of the transducer assembly for attaching the wires 12 and 14. Wire 12 is supported in the casing by glue 17 attaching it to the outer sides 32 and 34.

By moving the transducer 10 relative to a finger F with the finger bearing against the bottom 26 thereof the slight protruding stylus 30 contacts the ridges and depressions in the finger and if the transducer is moved at a linear scan in a controlled time relation the normally closed contact point 16 and contacting wedge 18 will be opened as stylus 30 hits each ridge and will stay open until the next depression is reached, thus producing an electrical signal which may be recorded or stored in any known manner or may be compared with stored fingerprints as will be described hereinafter.

A finger positioning means shown in FIGS. 3 and 4 is necessary in order to assure that a linear scan of the transducer relative to the human finger is in the same relative position as a scan along any fingerprint which has been placed in storage for comparison and recognition purposes. In other words, for the transducer to be of value in a recognition system there must be means for insuring that the same scan can be retraced across the human finger as a scan represented by signals in storage to be used for comparison and recognition purposes. It has been determined that the accuracy with which the finger must be located must be within a total tolerance of about .008 of an inch. This accuracy is needed so that there will not be too large a difference in a series of electrical representations in the form of pulses obtained from a scan when it is retracted several times, or when it is compared against a fingerprint representation in storage.

The optical apparatus and system shown in FIGS. 3 and 4 enables an individual to accurately position his own finger by comparing an image of his finger superimposed on a fixed position image of a print of his finger carried on an identification card or the like. The finger is then moved until its image coincides with the fixed image of the fingerprint provided from a print on a personal identification card or the like. The identification card may be placed in the apparatus and accurately located with respect to the transducer, then the finger is aligned with respect to an image of the fingerprint on the card to be in proper position to be transduced. Thus, the finger can be repeatedly positioned in the same spot.

The apparatus as shown in FIG. 3 includes a base 50 rigidly carrying identification card holder 52 including four angled brackets 53, 54, 55, and 56. The mounting of these brackets provides a pair of diagonal slots 58 and 60 for receiving and rigidly positioning a personal identification card 78 (FIG. 4) having a print of the individual's finger thereon. Also secured to the base is a beam splitting optical device 62 shown here as a beam splitter prism, although other known beam splitters such as a partially reflecting mirror 62' (FIG. 4) could be used. A pair of finger rest prims 64 and 66 are secured against the beam splitter prism 62 and the base by a suitable hold down 68 or the like. A suitable magnifier lens 70 is provided for magnifying the superimposed images of the fingerprint on the identification card and the finger image itself. Illumination means is provided from underneath the base 50 with suitable controls 72 and 73 for varying the relative intensity between the two images thereof and therefore the relative brightness of the images. An on-off control switch 74 controls the illumination. The fingerprint transducer 10 with protruding stylus 30 is positioned for sliding movement between finger rest prisms 64 and 66 and is driven by a mechanism 69 to scan along the ridge and depression pattern of a finger.

It is noted that the angle at the face of the prisms 64 and 66 upon which the finger is resting is at the same optical angle as the identification card position and slots 58 and 60, bearing an inked fingerprint. In order to minimize parallax it is preferable that the optical distance between card and optical prism or mirror be the same as that between finger image and prism or mirror and that the two optical images lies in the same plane. The basic components of the optical system and its operation are illustrated schematically in FIG. 4. The prism 64 produces an image of the ridge pattern of the finger resting thereon which image may be viewed through the beam splitter 62'. In my copending application Serial Number 827,219, filed July 15, 1959 and now abandoned, the operation of the prism 64 is shown and described. The identification card 78 positioned in a fixed position is used as a reference for positioning the finger. The image of the fingerprint F*p* on the card 78 is reflected from the beam splitter to provide superimposed images viewed from in front of the beam splitter. The finger may then be moved until the two images are exactly in alignment and then the finger is in a reference position relative to the transducer. The transducer 10 is shown in FIG. 3 between the prisms 64 and 66. After the finger is positioned the transducer is adapted to scan once along a particular line of the human finger and transduce the ridges and depressions into electrical pulses.

Figure 5:
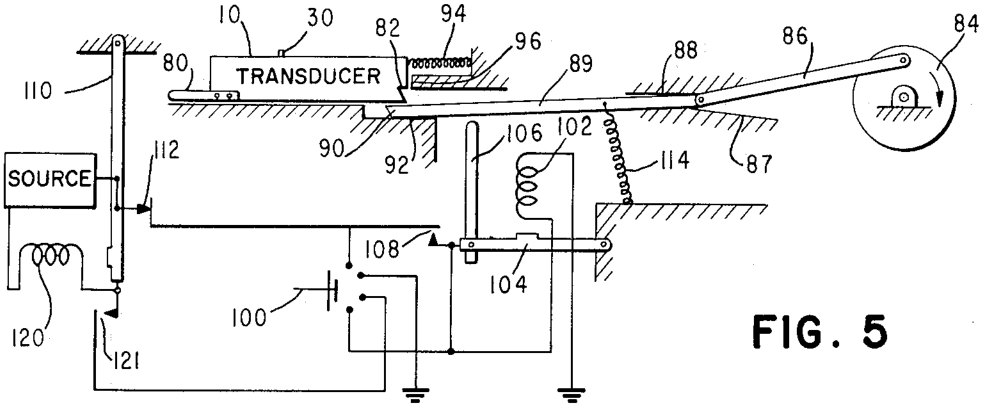
FIG. 5 is a partially schematic view illustrating the means for moving the fingerprint transducer for a single straight line scan across the skin pattern of a human finger.

In order that the transducer output may be read directly and compared directly with a similar representation of a stored fingerprint, the transducer must move in synchronism with the representation of the stored fingerprint and must move across the finger in straight scan only once. The means for accomplishing the foregoing objective is shown in FIG. 5. The transducer 10 which is movable as a unit in the space between prisms 64 and 66 and the transducer drive mechanism is illustrated schematically in FIG. 5.

The transducer casing includes a switch operator 80 and a drive engaging notch 82. Biasing means such as a spring 94 bias the transducer against a reference stop 96. The drive of the transducer is from a crank and pitman linkage including a drive crank or disc 84 pivotally connected to a connecting rod 86 the outer end of which slides in a guided path formed by stationary guides 87 and 88. Pivotally secured to the outer end of connecting rod 86 is a transducer pusher rod 89. The pusher rod is adapted to have two positions, one with its outer end 90 engaging the drive notch 82 in the transducer and the other being the position shown in FIG. 5 resting in a space formed by step 92 below the transducer.

When the pusher rod 89 is in the position shown in full line in FIG. 5 and with the drive crank 84 rotating in synchronism with a storage medium, the transducer does not move. To put the transducer actuating mechanism in operation a read switch 100 is depressed energizing a solenoid 102 below the pusher rod 89. Energization of the solenoid picks up its pivotal armature 104 thereby causing a lifter arm 106 to push pusher rod 89 upwardly into position to engage the drive notch 82 of the transducer when it moves forward. Contact 108 also connects a power source to the coil of the solenoid 102 to provide for holding the solenoid energized and the lifter arm 106 in its uppermost position after the read switch 100 is released. A breaker arm 110 is adapted to be actuated by switch operator 80 secured to the end of the transducer 10 as the tranducer moves forwardly. This will open the contacts 112 throughw hich energizing current is supplied to solenoid 102 thus dropping this solenoid out. As the pusher rod 89 is moved back under the action of drive crank 84 the spring 94 pulls the transducer 10 back in contact therewith until the transducer engages stop 96. Thus, the transducer 10 is gently moved back to its starting position. When the transducer 10 is resting against stop 96 the pusher rod 89 is pulled backwardly out of drive notch 82 and a spring 114 pulls the pusher rod 89 down into the lowermost position in step 92. It can thus be seen that the transducer is moved back and forth once and only once upon a depression of read switch 100.

If the read switch 100 is held down too long a coil 120 at the end of the breaker arm will be energized to hold the breaker arm 110 after operator 80 has pushed the breaker arm to close contacts 121, thereby keeping contacts 112 open and therefore lifter arm 106 cannot be energized.

Figure 6:
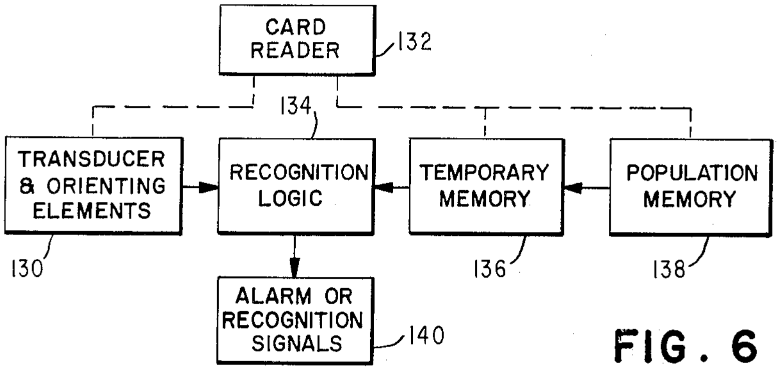
FIG. 6 is a block diagram representation of an entire fingerprint automatic recognition system.

The recognition system aspects of the invention are illustrated by block diagrams in FIG. 6. The transducer and orienting elements are represented as a block 130, this block 130 being controllable from a card reader 132. The transducer and orienting elements are connected to recognition or comparison logic 134 for comparing with comparable wave forms taken from a temporary memory 136. The temporary memory may secure its wave forms from a larger population memory 138. The temporary memory and population memory are also controlled from the card reader 132, and the temporary memory is synchronized with the transducer to feed signals to the recognition logic or comparison circuits in the same time relationship. A comparison or lack of comparison in the recognition logic 134 is fed to alarm or recognition signal circuits 140.

Figure 7:
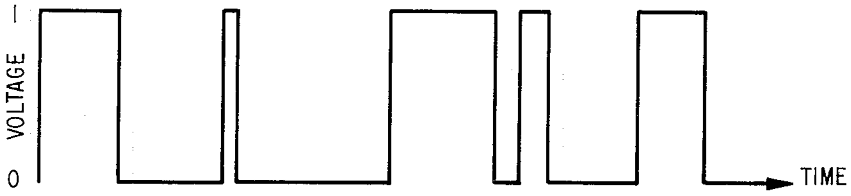
FIG. 7 is an illustration of a wave form representing the ridges and valleys of one particular individual's fingerprint configuration taken at a straight scan thereacross.

With a person to be identified placing his finger in proper oriented position on the transducer assembly and the read switch 100 being energized, the transducer 10 produces a signal which is characteristic of a scan along the ridge pattern of the person's finger. The characteristic signal is of the pulse width variety having two levels which will be termed 0 and 1. The 1 may indicate the presence of a fingerprint depression, contact 16 normally closed, and the 0 may indicate the presence of a fingerprint ridge, open contact 16 of transducer 10. The signal may be of the form indicated in FIG. 7. The start position indicated can be synchronized with a similar start position of a pulse width wave form taken from temporary memory 136. The recognition logic 134 compares this signal produced directly from the finger with a signal stored in the temporary memory 136. It is also possible that the drive of the transducer 10 from the crank 84 is the same drive as the drive for a storage drum or the like for temporary memory 136. They will then be synchronized in point of time. The signal in the temporary memory 136 may be obtained from the population memory 138 which contains similar identifying signals for an entire population or group of individuals utilizing the recognition system.

The temporary memory 136 may be referenced to the information for the particular individual by means of suitable controls such as a card reader 132. Other types of controls could be a keying unit or a characteristic signal produced by the fingerprint transducer. In which latter case, additional means of storage would be necessary between the transducer and the recognition logic.

The output of the recognition logic 143 is fed to the alarm or recognition signal circuit illustrated schematically in 140 which may produce several signals. One signal could indicate that the finger being read by the transducer is the same as the one whose characteristics are recorded in the memory. Another signal could be that the fingerprint being read by the transducer is significantly different from the characteristic being stored in the particular memory. And there also may be an intermediate signal for the cases where the system can determine a close but not similar comparison because of the change in the characteristics of the finger or due to a slight misalignment of the finger or due to dirt and the like.

The population memory 138 may consist of a high speed tape unit which has recorded upon it addresses followed by characteristic signals associated with a given individual represented by said address. The temporary memory 136 may consist of a small magnetic drum or disc file driven from the same drive as transducer drive crank 84. Its purpose is to provide a temporary storage for the information coming off of the tape unit from population memory 138 in the event that the tape unit, constituting the population memory 138, cannot be slowed down or started rapidly because of its intertia. While the large tape unit is running rapidly through the addresses, the temporary memory is cycling at high speed in synchronism with it. This synchronism consists of two start positions on the temporary memory and the population memory coinciding in time. This synchronization may be accomplished by a recorded track on the temporary memory drum and the population memory tape.

For cases where only a relatively few fingerprints are desired to be stored the population memory may be of such a design that it may be slowed down or stopped very rapidly to eliminate a temporary memory storage unit. Thus, the population memory unit would be stopped at the proper address and would wait for a synchronizing pulse provided by the read switch 100 of the transducer and would then read out the stored wave form at the same rate as the transducer is producing a wave form in its scan across the finger.

Figure 8:
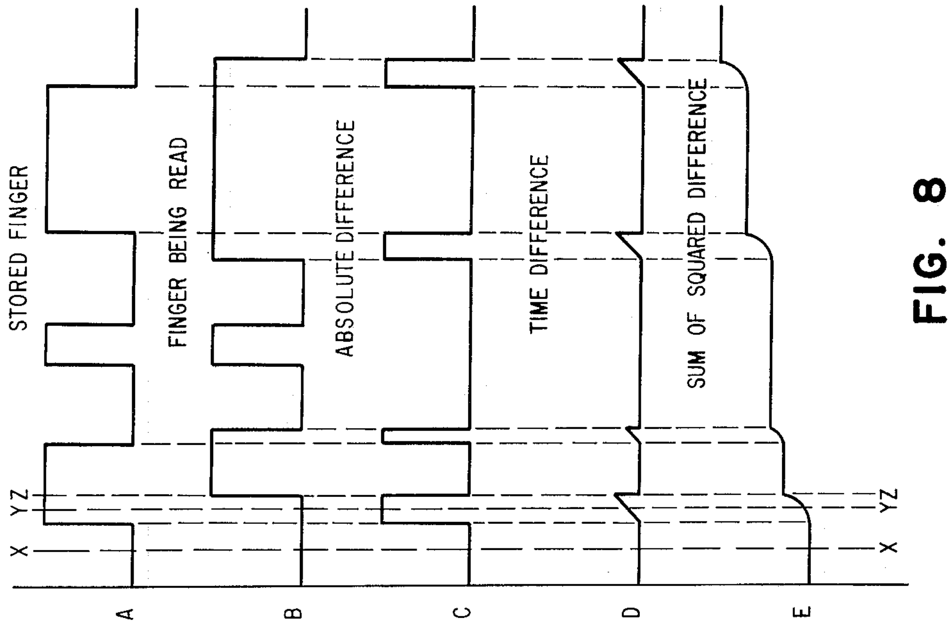
FIG. 8 is a showing of the wave forms representing a stored fingerprint and a human finger illustrating the comparison and the operation of determining whether there is an identity or dissimilarity.

The recognition logic 134 will consist of circuitry which will find the square of the absolute time difference between the stored fingerprint wave form and the transducer signal wave form from the finger and sum this value. Referring to FIG. 8, the stored finger characteristic wave pulses is shown in FIG. 8A. The fingerprint wave indicating the ridges and valleys of the finger produced by the transducer 10 is indicated by wave form in FIG. 8B. FIG. 8C indicates the absolute difference between FIGS. 8A and 8B. The peaks of the wave 8D represents the time difference and the wave form 8E represents the sum of the square time difference.

Figure 9:
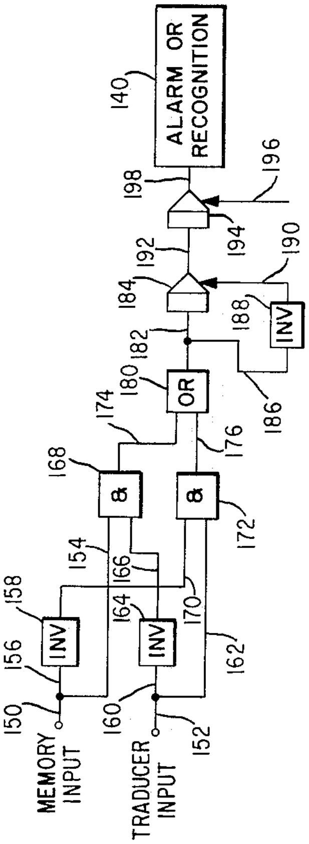
FIG. 9 is a logic diagram of the electrical comparison system.

The logical diagram of the components for accomplishing the function illustrated by the waves of FIG. 8 is shown in FIG. 9. In FIG. 9, input line 150 receives a pulse wave form representing a fingerprint in storage from the temporary memory 136 in synchronized time relationship to receipt of a pulse wave form from the transducer 10 of the actual fingerprint ridge and depression configuration from the transducer through line 152. Assuming that the waves are as shown in FIGS. 8A and 8B with the pulses indicating the two levels either 0 or 1, the pulses from line 150 are sent in the same condition as received via line 154 to an AND gate 168 to be compared with the pulse train from the transducer 10 represented by waves in FIG. 8B via line 160 through an inverter 164 and line 166 to AND gate 168. It can thus be seen that a point in time represented by dotted line *x* in FIG. 8, the pulse level of the stored finger being fed into the AND gate 168 is 0 while the inverted pulse level being fed into AND gate 168 through line 166 from the transducer (FIG. 8B) is 1. Since 0 and 1 are not the same there will be no output from AND gate 168 over line 174. In a similar manner the pulse input through input 150 also goes through line 156 to an inverter 158 and is fed through a conductor 170 to an AND gate 172 where it is compared with the direct input through line 152 and line 162 in AND gate 172. In a similar manner it can be seen that unless the wave forms shown in FIG. 8A and FIG. 8B are at the same voltage level at the same time, there will not be a coincidence and the AND gate will not function.

It can also be seen that at a time when the wave forms are not identical such as in time *y* indicated by dotted line in FIG. 8, the level of the input over line 150 will be 1 which is inverted by inverter 158 to 0 and fed to AND gate 172 which will compare with the level of the pulse wave of FIG. 8B being fed through input 152 and upon a coincidence at the 0 level, AND gate 162 will pass a signal through line 176 to OR gate 180. In a similar manner AND gate 168 is also connected by line 174 to OR gate 180. OR gate 180 will pass a signal upon coincidence at either one of the AND gates 168 or 172 through line 182 to an integrator 184. A similar signal is passed via line 186 to an inverter 188 and out from the inverter through line 190 to reset the integrator.

Referring to FIG. 8C, the wave forms at the time *y* will cause a coincidence at an AND gate to be fed through the OR gate 180 to the integrator 182 to build up the time difference shown in wave 8D as an output from the integrator through line 192.

At time *z* illustrated by dotted line in FIG. 8, the voltage levels of the input pulses are identical, there will be no output from either of the AND gates 168 or 172 and through OR gate 180 this 0 level will be inverted by inverter 188 and fed through reset line 190 to reset integrator 184 to its 0 condition.

The wave of FIG. 8D being fed through line 192 goes to an additional integrator 194 which integrates the time difference between the two inputs as shown in FIG. 8D. The output of integrator 194 is fed via line 198 to an alarm or recognition unit 140. A reset line 196 is provided in synchronism with the start pulse for the next transducer operation and the next input from memory to reset integrator 194 to 0 so that it will be ready for the logical operations on the next human finger and stored finger representations being compared.

Figure 10:
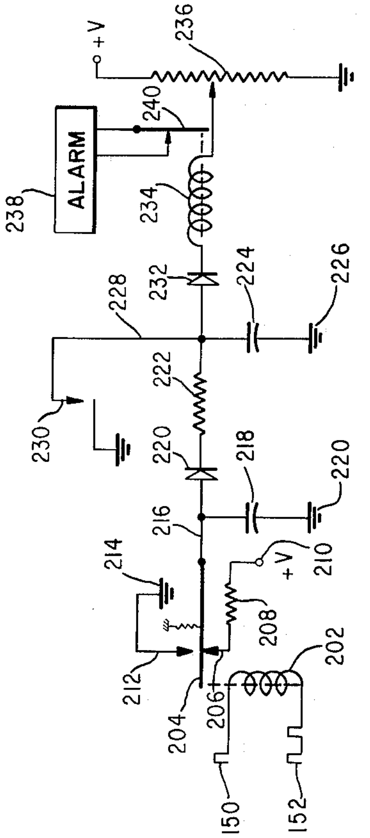
FIG. 10 is a circuit diagram illustrating one particular type of logical comparison system.

Referring now to FIG. 10 for one specific and rather simple circuit diagram of electrical components for accomplishing the logical functions set out in FIG. 9, the two inputs representing the waves in FIGS. 8A and 8B are fed in opposing relationship through lines 150 and 152 to a relay coil 202. Upon both input wave forms not being at the same level the relay is energized while if the two inputs are the same level the relay is not energized. Upon energization of the coil 202 breaker contact 204 connects contact 206 through a resistor 208 to a positive voltage source 210. This source is thus connected through resistor 208, breaker contact 204, and line 216 to a condenser 218 connected to ground 220. Resistor 208 and condenser 218 function as an integrator similar to integrator 184 shown in the block diagram logic of FIG. 9. The reset for this integrator is provided when the relay coil 202 is not energized, because contact 212 is connected by the biased breaker contact 204 to discharge condenser 218 to ground 214. As condenser 218 charges, a small current flows through isolation diode 220 to a resistor 222 and condenser 224. Resistor 222 and condenser 224 function as a second integrator similar to integrator 194 illustrated in FIG. 9. This integrator may be reset through reset switch 230. If the voltage of capacitor 224 reaches a predetermined value, current passes through another diode 232 to coil 234 of a relay. The coil is connected to an adjustable potentiometer 236 to provide for energization of the coil at a certain voltage level. Energization of the coil closes switch relay contacts 240 to energize an alarm 238.

Summarizing the operation of FIG. 10, when the input through lines 150 and 152 are not of the same pulse level at the same time, the source 210 is connected to capacitor 218 through resistor 208. This is the situation when the relay coil 202 is energized. When input 150 and input 152 are of the same level the relay coil is not energized and the capacitor 218 is connected to ground 214 through contacts 212 and is discharged. As the capacitor 218 charges, a small current flows through resistor 222 to capacitor 224 but cannot flow back because of the isolation diode 220. When the voltage in capacitor 224 reaches a predetermined value, diode 232 conducts energizing relay coil 234 closing relay contacts 240 and setting alarm 238 indicating a lack of comparison of the two input pulse trains 150 and 152 to a predetermined degree as determined by the setting of potentiometer 236.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for converting a distinctive configuration of ridges and valleys of a predetermined skin area of an individual such as a human fingerprint into electrical representations so that it may be handled in an information handling system, the apparatus comprising; a transducer means for transducing the particular skin area adjacent thereto into electrical representations, means for moving said transducer and a portion of skin area of an individual having said distinctive configuration of ridges and valleys relative to each other for scanning purposes, means for orienting and supporting the particular skin area of each individual in predetermined relationship to the relative movement of said transducer such that said relative movement will transform the ridges and valleys of the predefined skin area of an individual in the path of said transducer into electrical representations.

2. An apparatus as defined in claim 1 further comprising means for comparing the representations with stored representations representing the predefined skin area of an individual, and means for recognizing by said comparison the similarity and dis-similarity between skin areas depending upon whether the skin area is the same individual or a different individual.

3. An apparatus as defined in claim 1 wherein said transducer means comprises, a housing, an electric switch within said housing, and sensitive switch actuator means extending through the housing and adapted to engage the ridges and valleys of the skin configuration and upon relative movement utilize the ridges for operating said sensitive switch.

4. An apparataus as defined in claim 3 wherein said sensitive switch includes a fine wire extending through the housing and having a reverse bend portion functioning as one switch contact, the end of the fine wire extending through the housing to function as the switch actuator means, and a conductive wedge slidable in the housing and functioning as the other switch contact, said wedge being movable to adjust the contact pressure and the extension of said actuator outside of the housing.

5. A device for scanning a straight line across a predetermined portion of the skin area of an individual having a distinctive configuration of ridges and valleys such as a fingerprint, the device comprising; a transducer means adapted to transduce the ridge or valley configuration of a particular individual's fingerprint adjacent thereto into electrical representations, means for moving said transducer in a single straight line relative to the particular skin area of an individual, and means for precisely registering a skin area of an individual with the transducer to allow the transducer to scan the predetermined straight line relative thereto so that the same straight line through the ridges and valleys of a particular individual's skin configuration will be translated into electrical information which may be subsequently handled in a data processing system.

6. A device as defined in claim 5 further comprising means for storing electrical representations of a large number of individual fingerprints, means for comparing the representations of a stored fingerprint representation with the representations produced by said transducer, and signal means indicating a comparison or lack of comparison therebetween.

7. A system for establishing identification of a particular individual by fingerprint recognition, the system comprising; means for scanning linearly across a predetermined skin area of an individual which skin area has a distinctive configuration of ridges and valleys, means for transducing the ridge and valley configuration of the linear path across the predefined skin area scanned by said scanning means into a time sequence electrical signal, means for storing a number of electrical signals representing ridge and valley configurations corresponding to a linear scan taken across a linear path referenced relative to the skin area scanned, said signals in said storage means representing the skin area ridge and valley configuration of a large number of individuals, means for comparing the electrical signal representations of a particular individual's skin configuartion as produced by said transducer with representations of any one of said electrical signal representations in said storage means, and signal means controlled by said comparing means for indicating a degree of similarity or dis-similarity between the compared signals thereby establishing or disproving identification of the individual whose finger is being scanned.

8. In an automatic recognition system for the recognition of an individual by comparison of signals resulting from a scan across a predetermined skin area having ridge and valley configurations such as a fingerprint with a stored representation of signals indicative of a scan across the same area of a particular individual, said system comprising; a movable transducer including an extremely sensitive electric switch adapted to move adjacent a finger to be transduced, the transducer having a projecting actuator engaging ridges and valleys of said predetermined skin area and adapted to convert the ridges and valleys into electric signals, means for positively locating a predetermined skin area to be transduced relative to the movement of said transducer, said locating means including a fixed reference position for an identification card bearing an image of a fingerprint, a finger rest adjacent said movable transducer, and a beam splitter arrangement for allowing the fixed reference position image of said identification card and the image of said finger resting on said finger rest to be exactly aligned prior to movement of said transducer, a transducer moving device adapted to cause said transducer to scan a single scan straight across said predetermined skin area so positioned in reference position, storage means containing a number of electrical representations representative of a scan across a skin area at a reference position, said transducer moving means synchronized with said storage means for time synchronizing transduced and stored signals representing finger ridge and valley configurations, means for operating said transducer moving means in a single scan only across an accurately positioned human finger, means for comparing any of said signal representations in said storage means with the output of said transducer, and means responsive to said comparison for indicating recognition or nonrecognition indicators.

9. A system as defined in claim 8 further comprising a card reader controlling said operation of said transducer and the particular representations from said storage means to be compared with the output of said transducer.

10. A device as defined in claim 9 further comprising means for obtaining the absolute difference of a time sequenced wave form representaing the output of said transducer and the output from said storage, means for comparing said outputs in time sequence relationship, means for obtaining the time difference of said fingers, and means for summing the squared time difference of said signals to provide an output signal if a lack of comparison exists to operate an alarm means.

11. A system for establishing identification of a particular individual by fingerprint recognition, the system comprising; means for scanning linearily across a predetermined skin area of an individual which skin area has a distinct configuration of ridges and valleys such as a fingerprint, means for transducing the ridge and valley configuration of the predefined skin area in response to said scanning means into a time sequenced electrical signal, means for positioning said skin area in reference position relative to said scan, means for storing a number of electrical signals representing ridge and valley configurations corresponding to a scan taken across the linear path with the skin area in reference position, the storage of said signals representing skin areas of a large number of individuals, and means for comparing the representations of a particular individual's skin configuration as produced by and transduced with representations of any one of said representations in said storage means in a time synchronized relationship, and signal means controlled by said comparing means for indicating a degree of similarity or dissimilarity between the compared signals thereby establishing or disproving identification of the individual whose finger is being scanned.

12. In an automatic recognition system for the recognition of an individual by comparison of signals resulting from a scan across a predetermined skin area having ridge and valley configurations such as a fingerprint with a stored representation of signals indicative of a scan across the same area of a particular individual, said system comprising; a movable transducer to move adjacent a finger to be transduced, the transducer having an actuator sensing ridges and valleys of said predetermined skin area and adapted to convert the ridges and valleys into time sequenced electric signals, means for positively orienting and locating a predetermined skin area to be transduced relative to the movement of said transducer, means for storing time sequenced electric signals representing a ridge and valley configuration corresponding to a linear scan across the skin area in reference position, the storage means storing signals representing the skin areas of a large number of distinct individuals, a transducer moving device adapted to cause said transducer to scan a single scan straight across said predetermined skin area so positioned in reference position, said transducer moving means synchronized with said storage means for time synchronizing transduced and stored signals representing finger ridge and valley configurations and arranged to be operated in a single scan only across an accurately positioned human finger, means for comparing any of said signal representations in storage with the output of said transducer, and means responsive to said comparison for initiating an alarm.

References Cited by the Examiner

UNITED STATES PATENTS

| | | | |
|---|---|---|---|
| 1,428,637 | 9/1922 | Hutchinson | 340—265 |
| 1,897,566 | 2/1923 | Alden | 340—265 |
| 2,085,935 | 7/1937 | Widenham | 283—7 |
| 2,372,451 | 3/1945 | Reason | 340—265 |
| 2,667,631 | 1/1954 | Schaurte | 340—265 |
| 2,679,636 | 5/1954 | Hillyer | 340—149 |
| 2,712,898 | 7/1955 | Knutsen | 340—149 |
| 2,731,621 | 1/1956 | Sontheimer | 340—149 |
| 2,785,388 | 3/1957 | McWhirter | 340—149 |
| 2,934,708 | 4/1960 | Stuntz | 340—149 |

OTHER REFERENCES

Publication: Electronics, page 191, "A Grid Glow Micrometer," Robert W. Carson, June 1932.

NEIL C. READ, *Primary Examiner.*

IRVING SRAGOW, *Examiner.*